United States Patent [19]

Schumacher et al.

[11] Patent Number: 5,038,160

[45] Date of Patent: Aug. 6, 1991

[54] CAMERA SUPPORT APPARATUS

[76] Inventors: Frank J. Schumacher; Merle D. Schumacher, both of 9422 SW. Line Dr., Cornelius, Oreg. 97113

[21] Appl. No.: 597,556

[22] Filed: Oct. 15, 1990

[51] Int. Cl.$^5$ .............................................. G03B 17/00
[52] U.S. Cl. ..................................................... 354/82
[58] Field of Search ......................................... 354/82

[56] References Cited

U.S. PATENT DOCUMENTS 4,542,966 9/1985 Knaudt ................................. 354/82

Primary Examiner—Michael L. Gellner
Attorney, Agent, or Firm—Leon Gilden

[57] ABSTRACT

A support including a plurality of spaced plates coextensive and parallel to one another in a fixed relationship, including a slider plate mounted therebetween, wherein the slider plate is extensible relative to the top and bottom plates that are secured together for positioning upon an individual's shoulder. The slider plate includes a slot with an abutment member cooperative with a set screw to prevent removal of the slider plate relative to the top and bottom plates. Spring detent means are provided to maintain the slider plate between the top and bottom plates in a stored configuration.

6 Claims, 4 Drawing Sheets

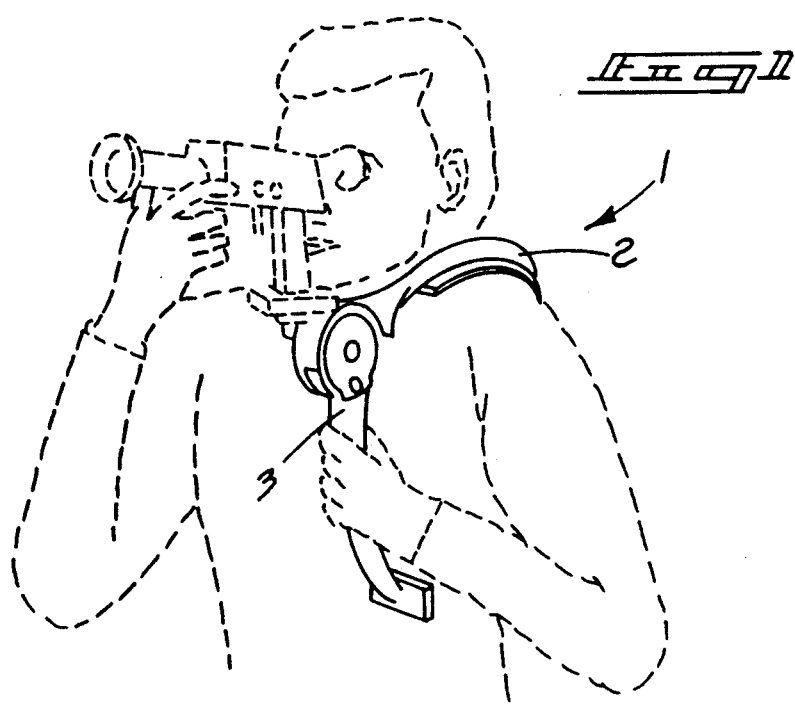
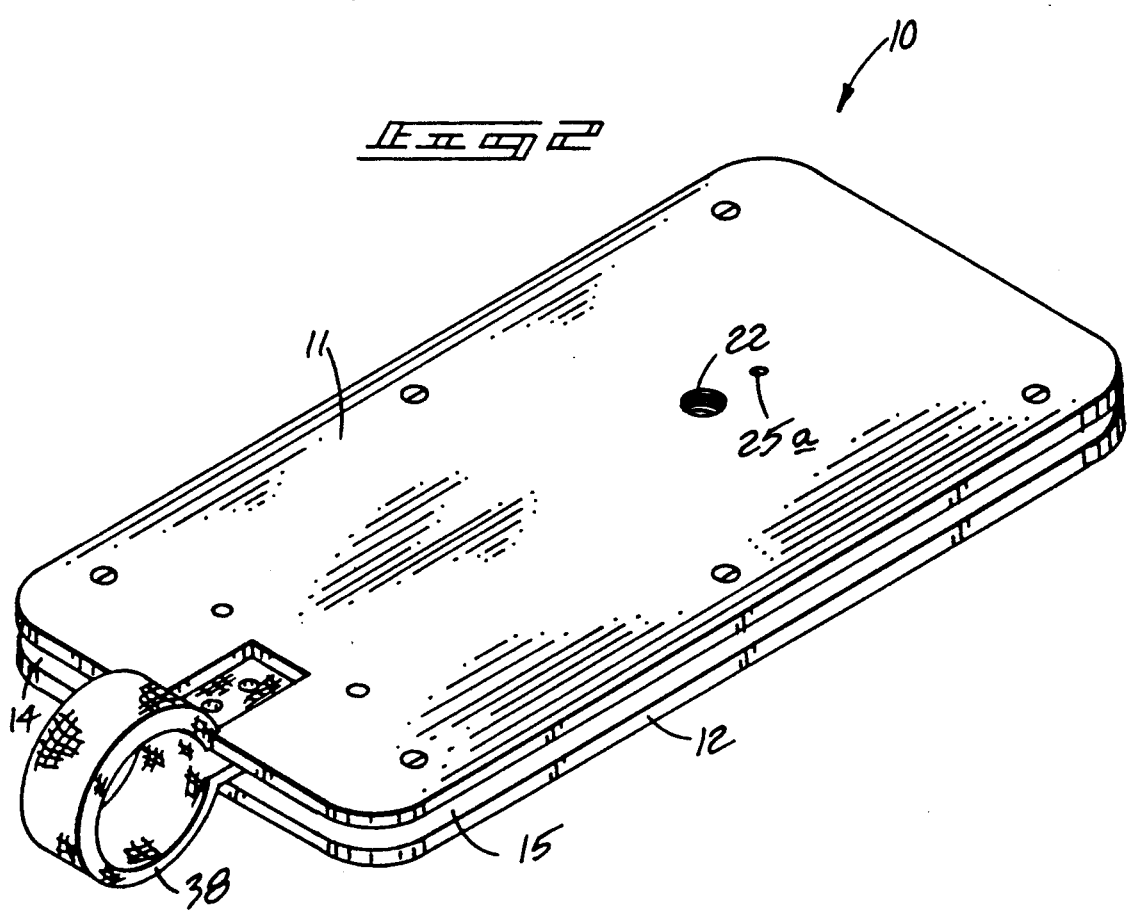

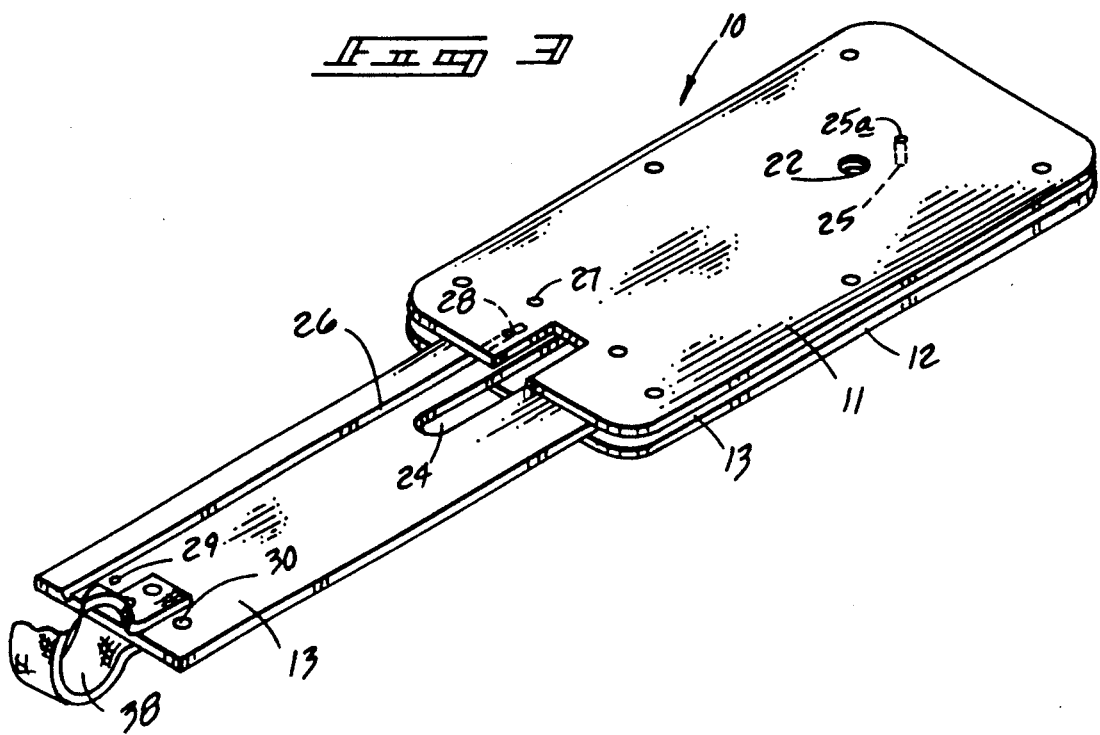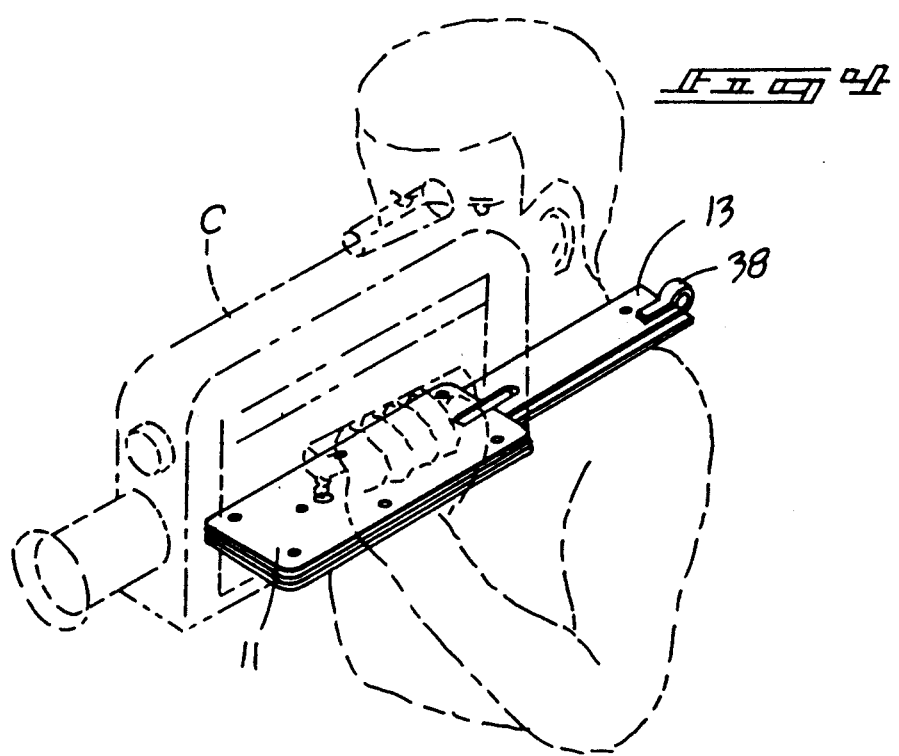

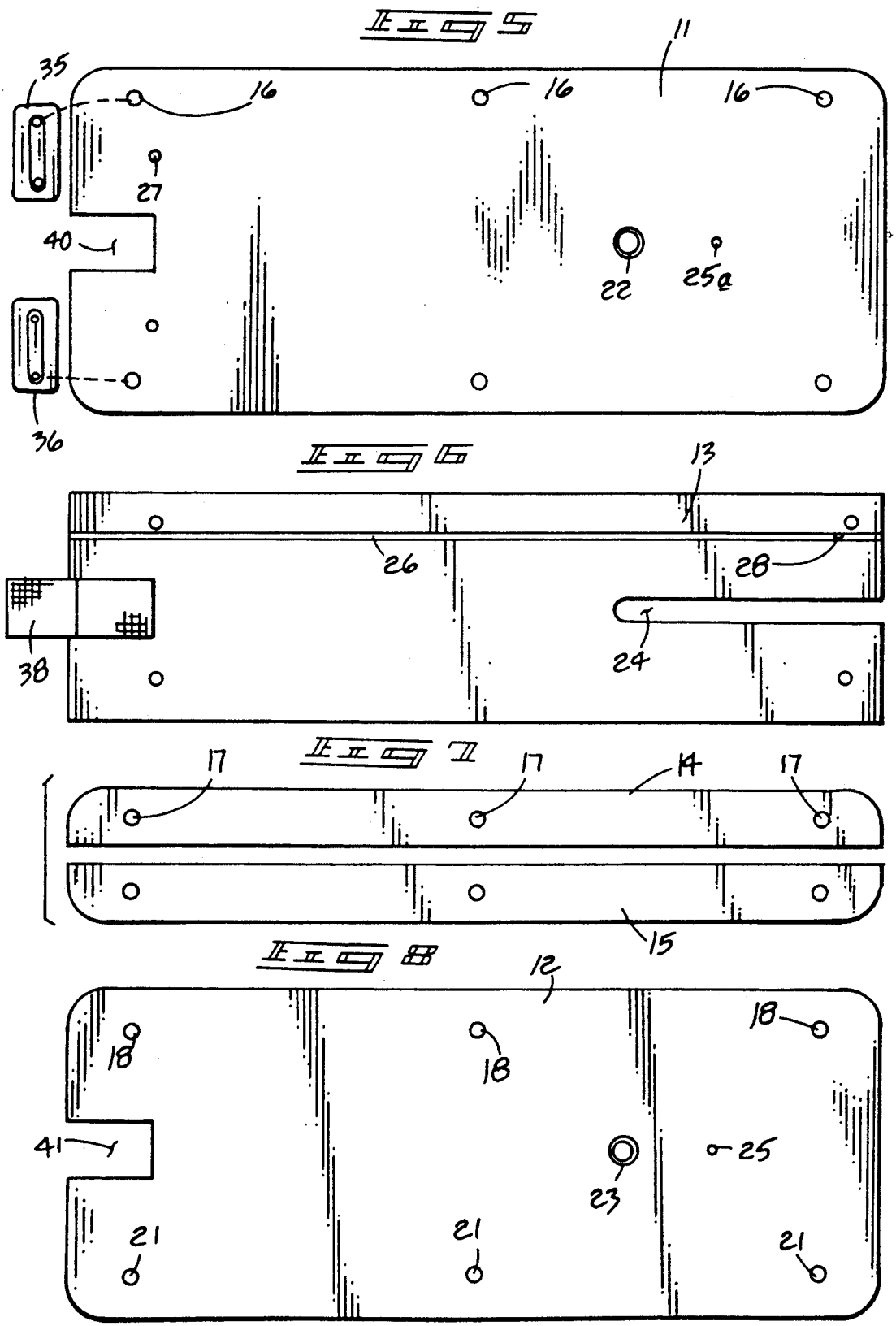

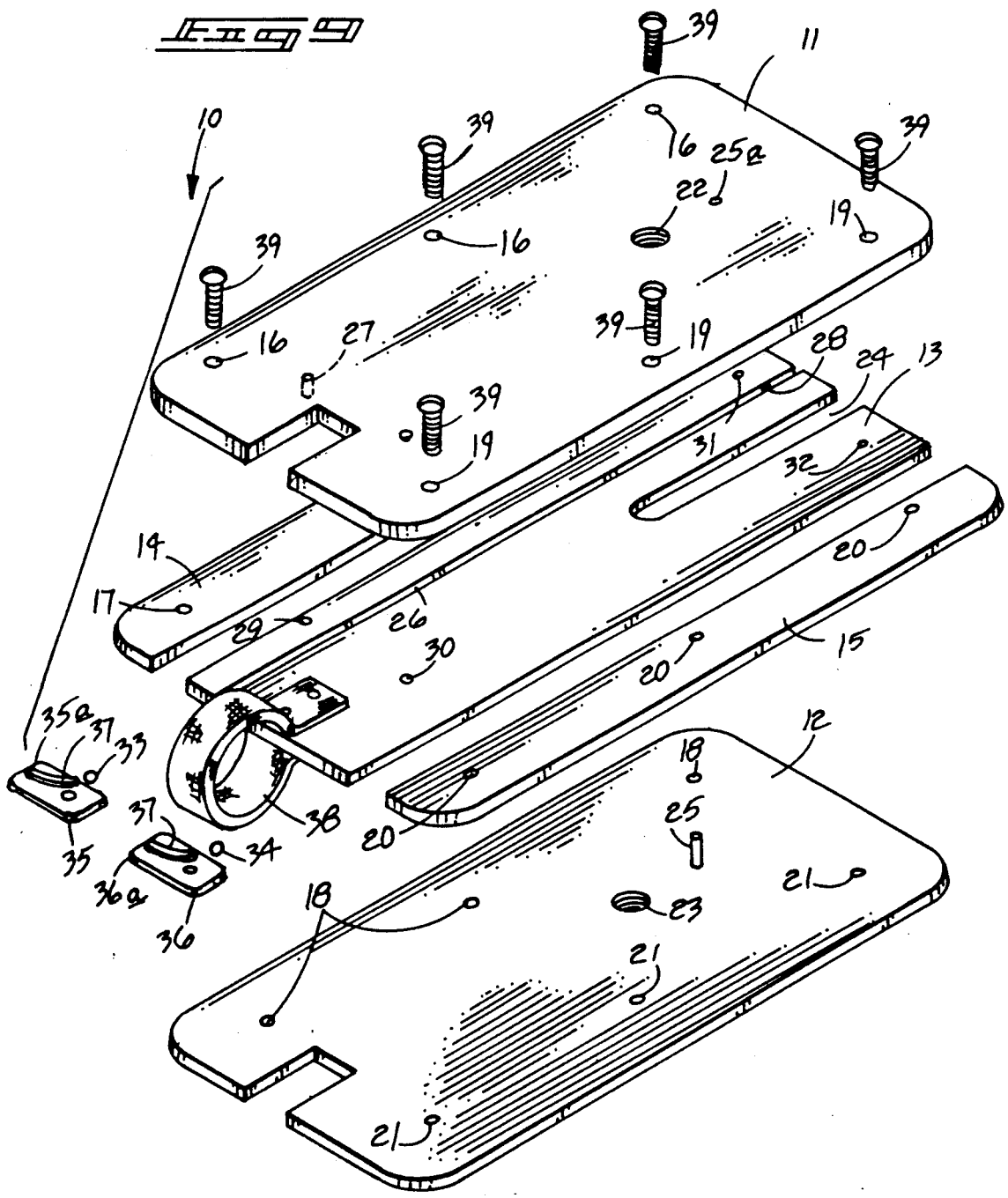

CAMERA SUPPORT APPARATUS

BACKGROUND OF THE INVENTION

1. Field of the Invention

The field of invention relates to camera support apparatus, and more particularly pertains to a new and improved camera support apparatus wherein the same permits compact storage in association with a camera member and subsequently permits ease of extension for mounting upon an individual's shoulder.

2. Description of the Prior Art

The transport and use of contemporary camera structure, and particularly the advent of video cameras, such as camcorders and the like, has introduced an aspect of film making where individuals are required to position and transport such devices for extended periods of time. In an effort to provide a steady and convenient support positioning structure, there have been prior attempts to provide camera rests, but such rests have included relatively elaborate and awkward structure relative to the instant invention. Such structure may be found for example in U.S. Pat. No. 4,244,500 to Fournier wherein a generally "C" shaped mount is pivotally mounted at a central junction, wherein the junction includes a support for mounting a camera thereon.

U.S. Pat. No. 4,514,067 to Gallegos, et al. sets forth an elongate twin camera mounting structure, with a rearwardly oriented "C" shaped bracket and a surrounding strap for mounting and positioning the bracket relative to an individual's shoulder.

U.S. Pat. No. 4,437,753 to Dunn sets forth a support structure for a camera providing a multiple of articulated linkages for mounting adjacent an individual's shoulder and chest portion.

U.S. Pat. No. 4,542,966 to Knaudt sets forth a further example of a shoulder positioned camera support, wherein the organization includes various linkage members for the mounting and positioning of the camera structure.

U.S. Pat. No. 4,327,986 to Carter sets forth a camera support, wherein an elongate rod is provided with a plurality of straps that circumferentially position about an individual's torso in addition to a shoulder strap structure for mounting the organization.

As such, it may be appreciated that there continues to be a need for a new and improved camera support apparatus as set forth by the instant invention which addresses both the problems of ease of use as well as effectiveness and compactness of construction and in this respect, the present invention substantially fulfills this need.

SUMMARY OF THE INVENTION

In view of the foregoing disadvantages inherent in the known types of camera support structures now present in the prior art, the present invention provides a camera support apparatus wherein the same provides for a housing of a generally parallelepiped configuration including a slide plate mounted therewithin, wherein the slide plate is fixedly positionable relative to the housing for the housing mounting and camera thereon. As such, the general purpose of the present invention, which will be described subsequently in greater detail, is to provide a new and improved camera support apparatus which has all the advantages of the prior art camera support organizations and none of the disadvantages.

To attain this, the present invention provides a support including a plurality of spaced plates coextensive and parallel to one another in a fixed relationship, including a slider plate mounted therebetween, wherein the slider plate is extensible relative to the top and bottom plates that are secured together for positioning upon an individual's shoulder. The slider plate includes a slot with an abutment member cooperative with a set screw to prevent removal of the slider plate relative to the top and bottom plates. Spring detent means are provided to maintain the slider plate between the top and bottom plates in a stored configuration.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved camera support apparatus which has all the advantages of the prior art camera support organizations and none of the disadvantages.

It is another object of the present invention to provide a new and improved camera support apparatus which may be easily and efficiently manufactured and marketed.

It is a further object of the present invention to provide a new and improved camera support apparatus which is of a durable and reliable construction.

An even further object of the present invention is to provide a new and improved camera support apparatus which is susceptible of a low cost of manufacture with regard to both materials and labor, and which accordingly is then susceptible of low prices of sale to the consuming public, thereby making such camera support apparatus economically available to the buying public.

Still yet another object of the present invention is to provide a new and improved camera support apparatus which provides in the apparatuses and methods of the prior art some of the advantages thereof, while simultaneously overcoming some of the disadvantages normally associated therewith.

Still another object of the present invention is to provide a new and improved camera support apparatus wherein the same provides a structure that is conveniently transported for periods of non-use, mounted to an associated camera and extended for mounting and positioning of a structure relative to an individual's shoulder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art camera support apparatus.

FIG. 2 is an isometric illustration of the instant invention.

FIG. 3 is an isometric illustration of the instant invention in an extended configuration.

FIG. 4 is an isometric illustration of the instant invention mounting an associated camera thereto.

FIG. 5 is an orthographic bottom view of the plate structure of the instant invention.

FIG. 6 is an orthographic top view of the slide plate utilized by the instant invention.

FIG. 7 is an orthographic top view of a first and second side plate utilized by the instant invention.

FIG. 8 is an orthographic top view of the bottom plate utilized by the instant invention.

FIG. 9 is an isometric illustration of the instant invention in an exploded configuration.

DESCRIPTION OF THE PREFERRED EMBODIMENT

With reference now to the drawings, and in particular to FIGS. 1 to 9 thereof, a new and improved camera support apparatus embodying the principles and concepts of the present invention and generally designated by the reference numeral 10 will be described.

FIG. 1 illustrates a prior art camera support apparatus 1 utilizing a first arcuate brace 2 pivotally mounted to a second arcuate brace 3 at a junction that includes a mount to support a camera thereon, in a manner as set forth in U.S. Pat. No. 4,244,500.

More specifically, the camera support apparatus 10 of the instant invention essentially comprises (see FIG. 9) a top plate 11 arranged parallel to and coextensively spaced above a bottom plate 12. A slider plate 13 is retractably and telescopingly received in a complementary arrangement within a cavity defined between the top and bottom plate 12 and defined by respective first and second side plates 14 and 15 that are fixedly secured to opposed sides of the top and bottom plate and mounted therebetween. The top plate includes a series of equally spaced top plate first side apertures 16 arranged coaxially overlying a respective series of first side plate apertures 17 that are in turn coaxially aligned with a series of bottom plate first side apertures 18 that in turn receive fasteners 39 through the apertures 16, 17 and 18. In a like manner, the top plate 11 includes a series of top plate second side apertures 19 coaxially overlying a series of equally spaced second side plate apertures 20 that are in turn overlying a series of bottom plate threaded apertures 21 to receive fasteners 39 to secure the housing together, in a manner as illustrated in FIG. 3 for example. The top plate includes a top plate camera bolt bore 22 coaxially overlying a bottom plate camera bolt bore 23. The bores 22 and 23 are coaxially aligned to receive a threaded stud from a camera or in turn may mount a stud member in a rotatable manner to receive a mounted camera "C" thereon, in a manner as illustrated in FIG. 4. The slide plate 13 includes a slide plate slot 24 directed medially and longitudinally of the slide plate 13 and extends interiorly thereof from a rear side edge towards the center thereof. An alignment pin 25 orthogonally mounted to the bottom plate 12 extends through the slot 24 and is fixedly received within an alignment pin bore 25a within the top plate 11. A slide plate groove 26 arranged parallel to the slide plate slot 24 and parallel to the right and left sides of the slide plate extends coextensively thereof and includes a set screw abutment 28 positioned within the groove 26 adjacent the rear edge of the slide plate 13. The abutment 28 is cooperative with a set screw 27 that is threadedly directed through the top plate 11 and received within the groove 26 to effect an abutment between the screw 27 and the abutment 28 to prevent complete removal of the slide plate 13 from the housing defined by the top plate 11, the bottom plate 12, and the spaced first and second side plates 14 and 15. Further, the set screw 27 may be directed downwardly to frictionally secure the slide plate 13 in a desired extended orientation relative to the aforenoted housing. Further, the slide plate 13 includes a first and second semi-spherical recess 29 and 30 adjacent the forward edge of the slide plate 13 and adjacent the sides thereof. Similarly, a third and fourth semi-spherical recess 31 and 32 are positioned within the slide plate adjacent the rear edge of the slide plate, wherein the first and third recesses 29 and 31 and the second and fourth recesses 30 and 32 define parallel lines that are parallel to one another and the slide plate groove 26. The first pair of recesses defined by the first and second semi-spherical recesses 29 and 30 cooperate with respective first and second detent spheres 33 and 34 that are mounted within respective first and second detent plates 35 and 36 that are secured to the housing by first and second plate mounting bores 35a and 36a respectively that receive a respective forward fastener 39 directed through forward apertures 16 and 19 between the top plate 11 and the respective first and second side plates 14 and 15. The detent plates 35 each utilize a spring 37 to bias an associated detent sphere 34 into cooperation with the first and second semi-spherical recesses 29 and 30 when the slide plate is in a first retracted position and cooperate with the third and fourth recesses 31 and 32 when the slide plate is an extended position to assist in positioning the slide plate in a desired orientation relative to the housing. A pull handle 32 is mounted to the forward end of the slide plate 13 and is positionable within the spaced top plate forward recess 40 and the bottom plate forward recess 41 that coextensively overlie one another and are formed within the forward edges of the top and bottom plates 11 and 12 respectively, as illustrated.

In use, the slide plate 13 is retracted from the housing and positioned to overlie an individual's shoulder, in a manner as illustrated in FIG. 4, to provide a steady rest for a camera "C" for use in video camera use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A camera support apparatus comprising, in combination,
    a housing defined by a top plate overlying and coextensively mounted to a bottom plate, and
    the top and bottom plates further including a first side plate mounted fixedly between the top and bottom plates coextensively along a first elongate side edge of the top and bottom plate, and a second side plate mounted coextensively between the top and bottom plate along a second side edge defining a cavity therewithin, and
    a slide plate slidably mounted between the top plate and the bottom plate, and
    the top plate including mounting means for securement of a camera thereon.

2. An apparatus as set forth in claim 1 wherein the slide plate includes a slide plate slot directed interiorly of the slide plate from a rear edge thereof longitudinally of the slide plate and terminating interiorly of the slide plate, and the mounting means directed between the top plate and bottom plate through the slide plate slot of the slide plate.

3. An apparatus as set forth in claim 2 wherein the slide plate further includes a groove extending longitudinally of and adjacent a first side edge of the slide plate adjacent the first side plate, and the groove including an abutment member positioned within the groove, and the top plate including a screw member directed through the top plate extending into the groove, with the screw positioned adjacent a forward edge of the top plate to cooperate with the abutment to prevent removal of the slide plate from the housing.

4. An apparatus as set forth in claim 3 wherein the top plate includes a top recess directed interiorly of the top plate from the forward edge thereof, and the bottom plate including a bottom recess coextensive with and underlying the top recess, and the slide plate including a slide plate handle positionable within the top and bottom recess when the slide plate is retracted within the housing between the top plate and the bottom plate.

5. An apparatus as set forth in claim 4 wherein the slide plate includes a first and second semi-spherical recess formed within a top surface of the top plate, and the bottom plate including a spring-biased first and second detent sphere cooperative with the first and second recess to permit reception of the first and second sphere within the first and second recess respectively and maintain the slide plate in a retracted orientation within the housing, and a third and fourth semi-spherical recess mounted within the top surface of the slide plate adjacent the rear edge of the slide plate and cooperative with the first and second sphere to position the slide plate in an extended orientation relative to the housing when the first and second sphere are received within the third and fourth recess.

6. An apparatus as set forth in claim 5 including a first detent plate mounted between the top plate and the first side plate, and a second detent plate mounted between the top plate and the second side plate, with the first plate including a spring member biasing the first detent sphere downwardly onto the slide plate, and the second detent plate mounted between the top plate and the second side plate, including a further spring member to bias the second detent sphere downwardly onto the top surface of the slide plate.

* * * * *